UNITED STATES PATENT OFFICE.

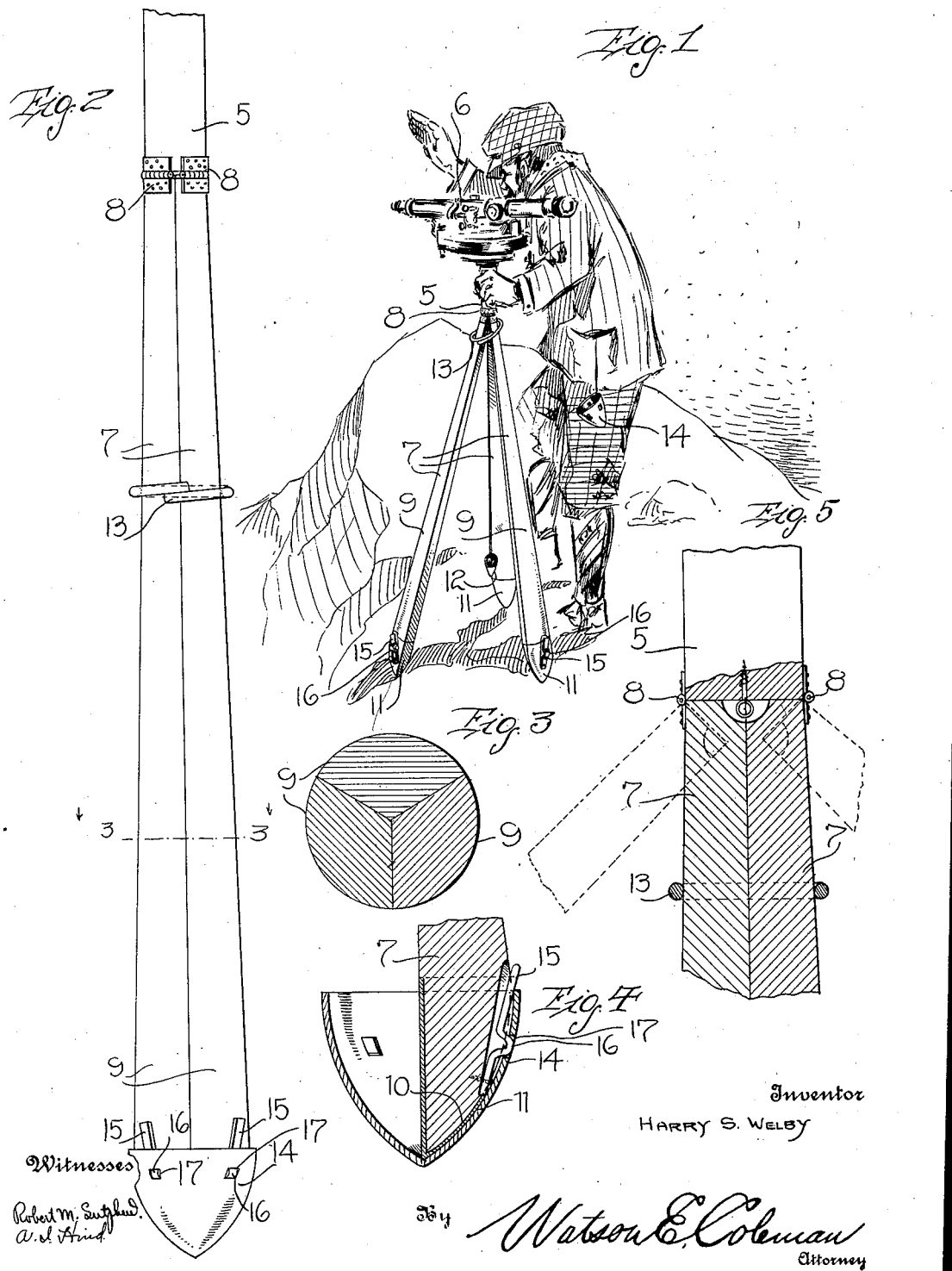

HARRY S. WELBY, OF FRESNO, CALIFORNIA.

COMBINATION TRIPOD AND STAFF.

1,093,750.  Specification of Letters Patent. Patented Apr. 21, 1914.

Application filed April 23, 1913. Serial No. 763,161.

*To all whom it may concern:*

Be it known that I, HARRY S. WELBY, citizen of the United States, residing at Fresno, in the county of Fresno and State of California, have invented certain new and useful Improvements in Combination Tripods and Staves, of which the following is a specification, reference being had to the accompanying drawings.

This invention relates to an improved tripod such as is used by surveyors for supporting a compass or other instrument, and has for its object to provide a device of this character which may be readily converted into a serviceable staff for affording assistance in climbing hills or rugged peaks.

Another and more specific object of the invention resides in the provision of an instrument supporting head or body, a plurality of legs hingedly connected at one of their ends to said head, and improved means for securely retaining said legs in their closed positions, whereby they conjunctively serve the purpose of a rod or staff.

Still another object of the invention is to provide a combination staff and tripod of the above character which will be strong and serviceable in practical use, and may be embodied in practical form at comparatively small manufacturing cost.

With the above and other objects in view as will become apparent as the description proceeds, the invention consists in certain constructions, combinations and arrangements of the parts as I shall hereinafter fully describe and claim.

For a full understanding of the invention, reference is to be had to the following description and accompanying drawing, in which—

Figure 1 is a perspective view showing the invention set up for use as a tripod; Fig. 2 is a side elevation, showing the legs secured in their folded positions, in which condition the device is adapted for use as a staff; Fig. 3 is a section taken on the line 3—3 of Fig. 2; Fig. 4 is a longitudinal section illustrating a metal reinforcing tip and holding means therefor which may be used in connection with the device, when the same is employed as a staff; Fig. 5 is an enlarged detail longitudinal section.

Referring in detail to the drawing, 5 designates the head or body of my improved tripod which may be of any preferred form and upon which the compass or other instrument indicated at 6 is adapted to be detachably secured.

To the lower end of this body, a plurality of supporting legs 7 are hingedly connected at their upper ends as shown at 8. These legs are each of substantially triangular shape in cross section and have convex or rounded outer faces 9. It will further be noted that said supporting legs gradually increase in cross sectional area from their upper hinged ends to a point adjacent the lower ends thereof, said lower ends being gradually reduced or tapered as shown at 10. The side faces of these supporting legs are adapted for close engagement when the same are folded so that they define a circular cross sectional form as shown in Fig. 3. The lower tapered end of each of the supporting legs is armed with a heavy metal plate 11 which is adapted to be forced into the ground.

When the device is set up for use as a tripod, a plumb-bob 12 may be attached to the lower end of the head 5 by any preferred means.

In order to securely hold the supporting legs in their closed positions, I provide a split resilient ring 13, the ends of which overlap. This ring is adapted to be forced downwardly upon the convex outer surfaces of the supporting legs and it will be obvious that the pressure of this ring against said supporting legs will gradually increase as it is moved downwardly upon the larger or thicker portions thereof. Thus the legs are held in close engagement with each other and the metal reinforcing plates 11 provide an inverted cone shaped lower terminal which is adapted to be thrust into the ground. It will thus be appreciated that a very serviceable staff is produced having a comparatively large heavy lower portion whereby a secure anchorage of the same in the ground may be obtained.

In Fig. 4 of the drawing, I have shown a removable conical metal tip 14 which is adapted to be applied to the lower tapering ends of the tripod legs when the same are arranged in their closed positions. This protecting tip is adapted for use when the staff is to be embedded in extraordinarily hard or stony ground, and is held in position by means of the heavy resilient catch rods 15 which are fixed at one of their ends to the lower ends of the supporting legs and are provided with shoulders 16 for engagement through openings 17 in the protecting tip adjacent its upper edge. The catch rods 15 may be provided on one or all of the tripod legs as may be preferred.

From the foregoing, it is believed that the construction and manner of use of my improved combination tripod and staff will be clearly and fully understood. The legs when folded for use as a staff are securely held in their closed positions and the device may be easily carried and readily manipulated by the user. It is also quickly convertible into a tripod and provides a very efficient and serviceable support of this character. Owing to the extremely simple construction of the invention, it will be appreciated that the same can be produced at small manufacturing cost.

While I have shown and described the preferred form and construction of the several elements employed, it will be understood that the invention is susceptible of considerable modification without departing from the essential features or sacrificing any of the advantages thereof.

When the ground is soft, it is unnecessary to spread the legs 7 to their open positions as the device can be used as a supporting staff for the compass or other instrument by forcing or embedding the metal cap on the ends of the legs into the ground. When the instrument is to be set up upon hard stony ground, which the conical metal cap cannot penetrate, it will be necessary to open the legs as shown in Fig. 1.

Having thus described the invention, what is claimed is:

In a device of the character described, the combination of a head member, a plurality of supporting legs hingedly connected at one of their ends to said head member, said legs when in their folded positions constituting a staff of circular form in cross section, the lower end of each of said legs being tapered to form a pointed terminal upon the staff, a conical protecting metal tip for said terminal, and resilient holding members on said legs coacting with the metal tip to retain the same in position.

In testimony whereof I hereunto affix my signature in the presence of two witnesses.

HARRY S. WELBY.

Witnesses:
G. E. STEPHENSON,
C. H. MCPEEK.

---

Copies of this patent may be obtained for five cents each, by addressing the "Commissioner of Patents, Washington, D. C."